United States Patent
Robillard

(10) Patent No.: US 10,099,790 B2
(45) Date of Patent: Oct. 16, 2018

(54) AIRCRAFT PROVIDED WITH AN IMPROVED AIR CONDITIONING SYSTEM

(71) Applicant: Airbus Operations (SAS), Toulouse (FR)

(72) Inventor: Jerome Robillard, Seilh (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 225 days.

(21) Appl. No.: 14/929,752

(22) Filed: Nov. 2, 2015

(65) Prior Publication Data

US 2016/0130005 A1    May 12, 2016

(30) Foreign Application Priority Data

Nov. 6, 2014    (FR) ...................... 14 60716

(51) Int. Cl.
*B64D 13/08* (2006.01)
*B64C 1/10* (2006.01)
*B64D 13/06* (2006.01)

(52) U.S. Cl.
CPC ............ *B64D 13/08* (2013.01); *B64C 1/10* (2013.01); *B64D 2013/0688* (2013.01)

(58) Field of Classification Search
CPC ........................ B64D 13/08; B64D 2013/0688; B64D 13/06; B64D 13/00; B64D 2013/0618; B64C 1/10
See application file for complete search history.

(56) References Cited

U.S. PATENT DOCUMENTS

| | | | | |
|---|---|---|---|---|
| 3,583,658 A | * | 6/1971 | Herweg | B64D 13/08 244/118.5 |
| 6,306,032 B1 | * | 10/2001 | Scheffler | B64D 13/08 244/129.2 |
| 2002/0056286 A1 | * | 5/2002 | Ng | B64D 13/06 62/402 |
| 2004/0231350 A1 | * | 11/2004 | Kline | B64D 13/00 62/244 |
| 2007/0158499 A1 | * | 7/2007 | Whittingham | A61L 9/20 244/118.5 |
| 2008/0251592 A1 | * | 10/2008 | Baldauf | B64D 13/00 237/12.3 A |
| 2010/0240290 A1 | * | 9/2010 | Markwart | B64D 13/00 454/71 |

FOREIGN PATENT DOCUMENTS

| | | |
|---|---|---|
| EP | 1631326 | 3/2006 |
| EP | 1964775 | 9/2008 |

OTHER PUBLICATIONS

French Search Report, dated Jul. 10, 2015.

* cited by examiner

*Primary Examiner* — Valentina Xavier
(74) *Attorney, Agent, or Firm* — Greer, Burns & Crain, Ltd.

(57) ABSTRACT

An aircraft comprising an air conditioning system for a cabin of the aircraft. The system comprises a mixer unit capable of mixing air that has already circulated in the cabin and fresh air from the engines of the aircraft. The air mixed in this way is then channeled towards the cabin to ventilate it. The aircraft has an airtight bulkhead allowing the cabin to be separated from a rear compartment, in such a manner as to prevent any direct exchange of air between said cabin and said compartment. This airtight bulkhead constitutes a wall delimiting the mixer unit, at least in part.

12 Claims, 2 Drawing Sheets

AIRCRAFT PROVIDED WITH AN IMPROVED AIR CONDITIONING SYSTEM

CROSS-REFERENCES TO RELATED APPLICATIONS

This application claims the benefit of the French patent application No. 1460716 filed on Nov. 6, 2014, the entire disclosures of which are incorporated herein by way of reference.

FIELD OF THE INVENTION

The invention relates to an aircraft provided with an improved air conditioning system.

BACKGROUND OF THE INVENTION

An air conditioning system of an aircraft comprising a passenger cabin generally includes an air mixer unit (sometimes referred to as an "AMU") for fresh air and air that has already circulated in said passenger cabin, said mixer unit being capable of channeling the resulting air towards the cabin. An aircraft of this kind likewise comprises a rear bulkhead (sometimes referred to as an "RPB" or Rear Pressure Bulkhead) separating the passenger cabin and a compartment located to the rear of said cabin and kept at atmospheric pressure, said bulkhead being airtight and capable of keeping the cabin pressurized.

SUMMARY OF THE INVENTION

An object of the invention is to obtain an aircraft having an improved air conditioning system which is space-saving.

The object of the invention is an aircraft comprising a cabin and an air conditioning system of said cabin, said air conditioning system comprising an air mixer unit provided with at least one cool air intake, at least one intake for air that has already circulated in the cabin and at least one outlet allowing said cabin to be supplied with mixed air and said aircraft comprising an airtight bulkhead located between the cabin and a compartment situated to the rear of said cabin and allowing said cabin to be kept pressurized.

According to one characteristic of the invention, the bulkhead constitutes a wall delimiting the mixer unit at least in part.

According to a possible characteristic, the bulkhead is planar.

According to a possibly characteristic, the bulkhead is convex in shape.

According to a possible characteristic, the bulkhead extends in a substantially vertical and transverse direction of said aircraft.

According to a possible characteristic, said at least one cool air intake is realized from a drawing of air from at least one engine of said aircraft, said air then being cooled by means of a pre-conditioning device before being channeled towards said unit.

According to a possible characteristic, the intake of cool air coming from at least one aircraft engine is realized by a duct opening out in a lower area of the bulkhead.

According to a possible characteristic, the intake of air that has already circulated in the cabin is realized by a duct located below a floor of the cabin and opening out in a lower area of the mixer unit.

According to a possible characteristic, the outlet of air supplying the cabin is realized by a duct originating in an upper area of the air mixer unit and extending in a cabin ceiling.

According to a possible characteristic, an aircraft according to the invention comprises at least one intake for cool air coming from the outside of the aircraft.

According to a possible characteristic, the intake of cool air coming from the outside of the aircraft is realized by a duct opening out into a lower area of the bulkhead.

According to a possible characteristic, an aircraft according to the invention has at least one engine, each engine being fitted in a rear area of said aircraft.

According to a possible characteristic, the mixer unit is delimited by two elements made up of the bulkhead and a wall, at least one of two said elements being coated with a soundproofing material.

The second object of the invention is an air conditioning system for an aircraft according to the invention, said system comprising an air mixer unit provided with at least one cool air intake, at least one intake of air that has already circulated in the cabin and at least one outlet allowing said cabin to be supplied with mixed air. According to a possible characteristic of the invention, at least one of the walls delimiting the mixer unit is formed by an airtight bulkhead intended to separate the aircraft cabin from an unpressurized compartment of the aircraft.

The third object of the invention is an assembly for the realization of an air conditioning system according to the invention, said assembly comprising the air mixer unit and the airtight bulkhead. According to the invention, the bulkhead constitutes a wall delimiting the mixer unit at least in part.

BRIEF DESCRIPTION OF THE DRAWINGS

Below is a detailed description of a possible embodiment of an aircraft according to the invention with reference to FIGS. 1 to 6.

DETAILED DESCRIPTION OF THE PREFERRED EMBODIMENTS

Figure 1:
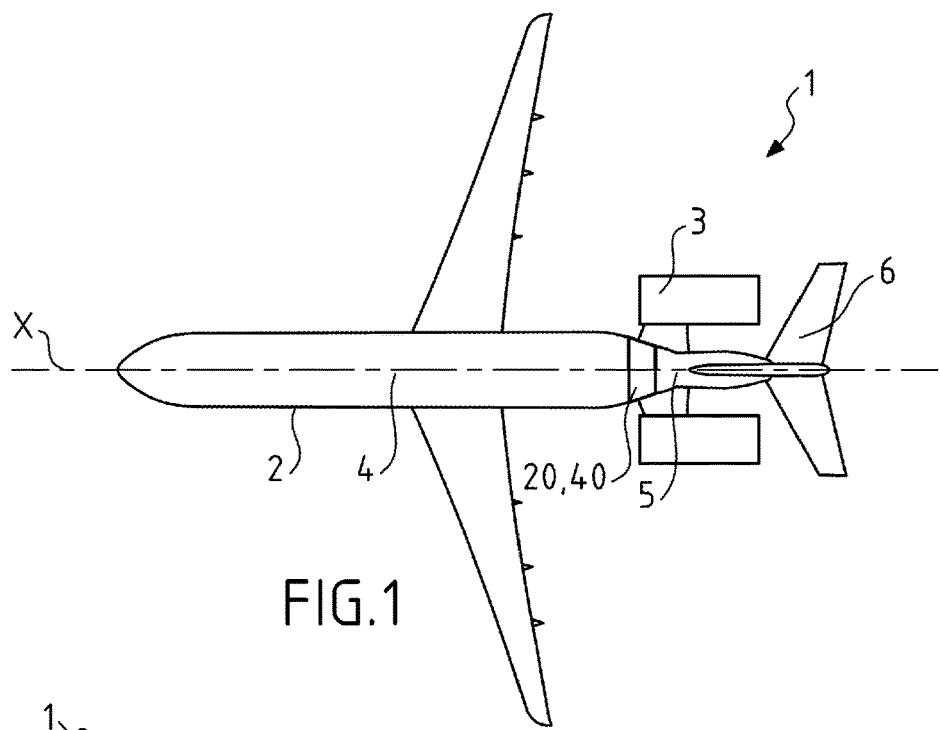
FIG. 1 is a general view of the top of an aircraft according to the invention.
Figure 2:
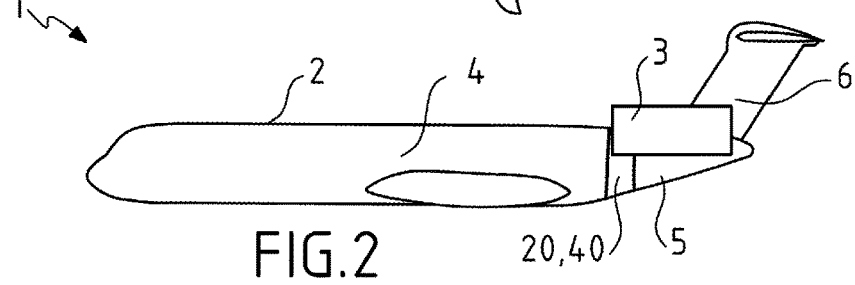
FIG. 2 is a side view of the aircraft in FIG. 1.

With reference to FIGS. 1 and 2, a possible embodiment of an aircraft 1 according to the invention comprises a fuselage 2 and two engines 3 fitted symmetrically to the rear of said fuselage 2. An aircraft 1 of this kind has an air conditioning system for a cabin 4 reserved for passengers, said system comprising an air mixer unit 20 situated in a rear area of the fuselage 2, in a slightly forward position in respect of said engines 3 and at the rear of the cabin 4. An airtight bulkhead 23 (FIG. 3) is interposed between said cabin 4, which is pressurized, and a rear compartment 5 of the fuselage 2 which is at atmospheric pressure. In this way, the bulkhead helps to maintain a certain level of pressure in the cabin 4 and thereby succeeds in preventing the ventilation air blown into said cabin 4 from being sucked in by said compartment 5. This compartment 5 is located between the cabin 4 and the tail 6 of the aircraft.

Figure 3:
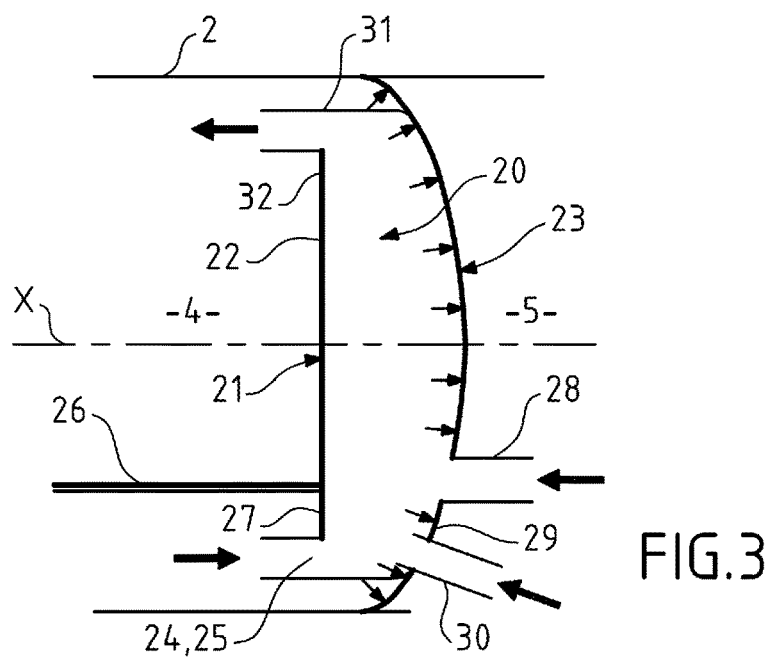
FIG. 3 is a schematic side view of a possible embodiment of an air mixer unit in an aircraft according to the invention.
Figure 4:
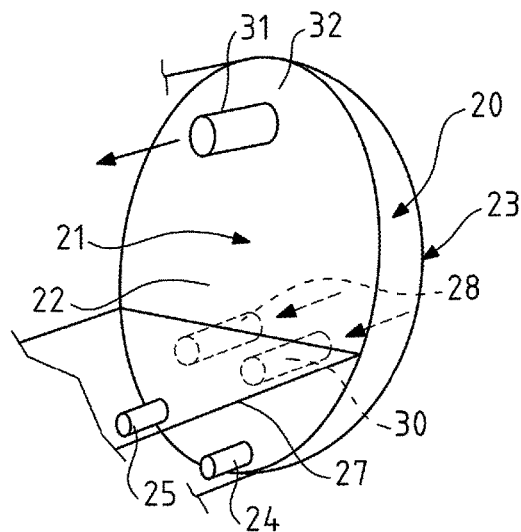
FIG. 4 is a schematic perspective view of the air mixer unit in FIG. 3.

With reference to FIGS. 3 and 4, according to a possible embodiment of an aircraft according to the invention, the air mixer unit 20 comprises an air mixer unit 21 delimited by a casing 22 and by the airtight bulkhead 23 separating the cabin 4 and the rear compartment 5. In this way, the air mixer unit 20 comprising said unit 21 and said bulkhead 23 constitutes a space-saving assembly. In fact, because the volume of the unit 21 is distributed over the entire surface of the bulkhead 23 (or at least over a large part of its surface), this unit 21 is relatively thin and only takes up a small amount of space.

Figure 5:
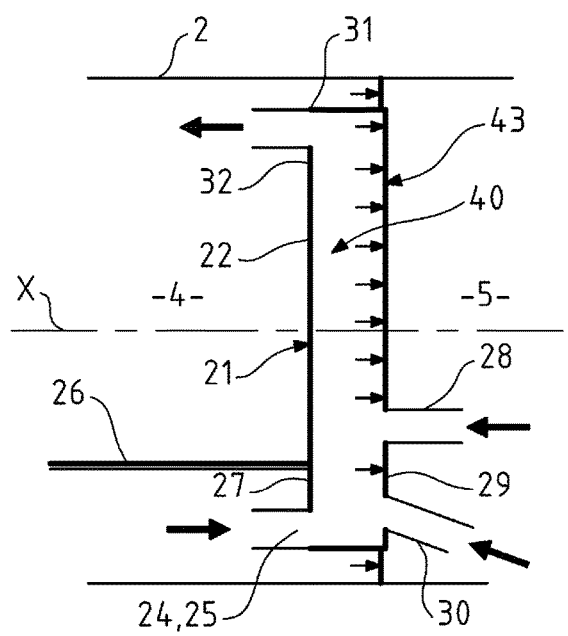
FIG. 5 is a side diagram of another possible embodiment of an air mixer unit in an aircraft according to the invention.

It should be noted that the bulkhead 23 constitutes the rear wall of the air mixer unit 20. For this embodiment, the bulkhead 23 is concave towards the inside of the unit 21 and exhibits an axis of revolution giving it the appearance of a dome. This bulkhead 23 extends in a substantially vertical and transverse plane of the aircraft 1, such that its axis of revolution is parallel to a longitudinal and horizontal axis X of said aircraft 1, as is shown in FIGS. 1, 3 and 5. The unit 21 exhibits two inlet ducts 24, 25 for air that has already circulated in the cabin 4, said two ducts 24, 25 being aligned in a substantially horizontal plane. These two ducts 24, 25 extend beneath a floor 26 of the cabin 4 and open out in the mixer unit 20 in a lower area 27 of the casing 22. The air mixer unit 20 comprises a first inlet duct 28 for fresh air coming from the rear engines 3 of the aircraft 1 opening out in said unit 20 in a lower area 29 of the bulkhead 23. More precisely, the air thereby drawn from said engines 3 is hot and is then cooled and adjusted to a required pressure level by a preconditioning device (not shown), before opening out into the air mixer unit 20. This air inlet 28 is therefore operational only when the engines 3 of the aircraft 1 are turning, in other words mainly during the flight phase. The air mixer unit 20 likewise has a second inlet duct 30 for fresh air coming from the outside of the aircraft 1 opening out into said unit 20 in a lower area 29 of the bulkhead 23. The air flow thereby drawn from the outside of the aircraft 1 is channeled towards the mixer unit 20. This second fresh air inlet duct 30 can be used when the aircraft 1 is on the ground and when the engines 3 are switched off and are not sending air along the first duct 28, or in order to address a malfunction in the fresh air supply circuit by involving said first duct 28. The air mixer unit 20 likewise comprises an outlet duct 31 capable of channeling towards the cabin 4 recombined air originating from the mixture of air that has already circulated in said cabin 4 (recycled air) and cool air drawn from the engines 3. In fact, said unit 20 comprises a mixing device based, for example, on a system of deflectors or vortex generator members intended to mix these two sources of air 24, 25 and 28 together closely, before sending the resulting air towards the cabin 4. This outlet duct 31 originates in an upper area 32 of the casing 22 of the unit 21 and extends horizontally at a ceiling of the cabin 4.

The mixer unit 20 is delimited by two elements, namely the casing 22 of the unit 21 and the airtight bulkhead 23. At least one of these two elements 22, 23 preferably has a soundproofing material disposed on at least one of its surfaces. This soundproofing material is preferably disposed on a surface of the casing 22 of the unit 21, in order to insulate the cabin from the noise produced by the mixer unit 20.

The casing 22 of the unit 21 comprises sensors, in particular for continuously measuring the temperature and pressure inside the mixer unit 20, in such a manner as to control the thermodynamic parameters of said unit and thereby anticipate any kind of incident.

The different arrows appearing in FIG. 3 indicate the directions of the different air flows entering or leaving the mixer unit 20 through different ducts 24, 25, 28, 30, 31 opening out into the unit 21 and the bulkhead 23.

Figure 6:
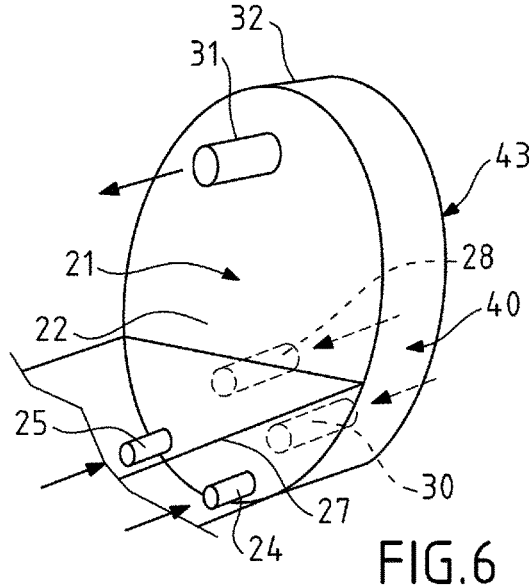
FIG. 6 is a schematic perspective view of the air mixer unit in FIG. 5.

With reference to FIGS. 5 and 6, another possible embodiment of an aircraft 1 according to the invention is distinguished from the possible embodiment described above by the fact that the airtight bulkhead 43 is no longer curved but is planar, all the other elements being integrally retained. In this way, this bulkhead 43 is part of a vertical and transverse plane of the aircraft 1.

With reference to FIG. 6, by reason of the shape of the leak-proof bulkhead 43, the mixer unit 40 adopts a substantially cylindrical geometry, the casing 22 of the unit 21 and the bulkhead 43 receiving the different intake ducts 24, 25, 28, 30 and the output duct 31 in an identical manner to that which has been described for the possible embodiment described above. With this particular embodiment involving an airtight, planar bulkhead 43, the amount of space saved in the aircraft is more significant than that obtained with a curved bulkhead 23.

An aircraft according to the invention has the advantage of possessing an air-conditioning system comprising a mixer unit which is compact and therefore space-saving, allowing a significant amount of space to be freed up in said aircraft. This unused space may, for example, be devoted to the installation of an additional row of seats for passengers. It may likewise be used as a comfort area for the passengers in the form of toilets, for example. In other cases, it is possible to free up freight storage space in the space formerly occupied by the mixer unit.

Moreover, it has the advantage of combining within the same assembly elements which have different functions, namely the mixer unit and the airtight bulkhead, which allows certain elements to be used for several functions. This means that a weight saving for the aircraft, the weight of the assembly made up of the mixer unit and the airtight bulkhead possibly being lower than the total weights of an airtight bulkhead and an air mixer unit from the prior art.

This leads to a reduction in manufacturing costs.

To conclude, the bulkhead 23, 43 and the mixer unit 21 are combined in the aircraft 1 to constitute a compact, space-saving assembly, thereby freeing up space to add an additional row of seats, for example. Moreover, a compact arrangement of this kind allows certain air circulation ducts to be shortened or else eliminated. In particular, when the aircraft engines 3 are located at the tail of the aircraft, the positioning of the mixer unit 21 at the rear airtight bulkhead 23, 43 of the cabin 4 allows the air circulation ducts to be shortened between the air intakes situated at the engine 3 and the mixer unit 21. This results in improved control of the air mixing conditions and the air distribution in the cabin 4. The bulkhead 23, 43 is configured to avoid any direct exchange of air between the compartment 5 and the cabin 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a cabin,
an air conditioning system of the cabin, the air conditioning system comprising:
  an air mixer unit comprising:
    a first intake for air that has already circulated in the cabin,
    a second intake for cool air coming straight from the outside of the aircraft,
    a third intake for conditioned air from at least one engine of the aircraft, the air cooled by means of a pre-conditioning device prior to input to the air mixer unit, and
    at least one outlet allowing the cabin to be supplied with mixed air, and
  an airtight bulkhead located between the cabin and a compartment situated to a rear of the cabin and allowing the cabin to be kept pressurized, the bulkhead constituting a wall delimiting the mixer unit, at least in part.

2. The aircraft according to claim 1, wherein the bulkhead is planar.

3. The aircraft according to claim 1, wherein the bulkhead is convex in shape.

4. The aircraft according to claim 1, wherein the bulkhead extends in a substantially vertical and transverse direction of said aircraft.

5. The aircraft according to claim 1, wherein the third intake of cool air coming from at least one engine of the aircraft is realized by a duct opening out in a lower area of the bulkhead.

6. The aircraft according to claim 1, wherein the first intake of air that has already circulated in the cabin is realized by a duct located below a floor of the cabin and opening out in a lower area of the mixer unit.

7. The aircraft according to claim 1, wherein the outlet of air supplying the cabin is realized by a duct originating in an upper area of the air mixer unit and extending in a cabin ceiling.

8. The aircraft according to claim 1, wherein the second intake of cool air coming from the outside of the aircraft is realized by a duct opening out into a lower area of the bulkhead.

9. The aircraft according to claim 1, further comprising at least one engine, the engine being fitted in a rear area of said aircraft.

10. The aircraft according to claim 1, wherein the unit is delimited by two elements made up of the bulkhead and a wall, at least one of two said elements being coated with a soundproofing material.

11. An air conditioning system for an aircraft, comprising:
an air mixer unit comprising:
  a first intake of air that has already circulated in the cabin,
  a second intake for cool air coming straight from the outside of the aircraft,
  a third intake for conditioned air from at least one engine of the aircraft, the air cooled by means of a pre-conditioning device prior to input to the air mixer unit, and
  at least one outlet allowing a cabin of the aircraft to be supplied with mixed air,
at least one of the walls delimiting the mixer unit being formed by an airtight bulkhead configured to separate the aircraft cabin from an unpressurized compartment of the aircraft.

12. The air conditioning system according to claim 11, wherein the bulkhead constitutes a wall delimiting the mixer unit, at least in part.

* * * * *